United States Patent [19]

Folland

[11] 4,259,022
[45] Mar. 31, 1981

[54] FUEL PRODUCING SYSTEM FOR SOLID/LIQUID MIXTURES

[75] Inventor: Roy E. Folland, Clarenceville, Canada

[73] Assignee: Folland Corporation, Coral Gables, Fla.

[21] Appl. No.: 101,858

[22] Filed: Dec. 10, 1979

[51] Int. Cl.³ .................. B01F 5/10; B01F 7/22; B01F 15/04
[52] U.S. Cl. .................. 366/152; 366/153; 366/159
[58] Field of Search .............. 366/136, 137, 134, 142, 366/152, 153, 160, 159; 137/3, 101.25, 563, 1

[56] References Cited

U.S. PATENT DOCUMENTS

| 1,722,433 | 7/1929 | Kirschbraun | 366/136 |
| 2,730,118 | 1/1956 | Cowan | 137/563 |
| 3,224,738 | 12/1965 | Tarukawa | 366/152 |
| 3,495,808 | 2/1970 | Klein | 366/152 |
| 3,741,533 | 6/1973 | Winn | 366/136 |
| 3,843,099 | 10/1974 | Duncan | 366/152 |
| 3,913,606 | 10/1975 | Anderson | 137/563 |
| 3,948,490 | 4/1976 | Troope | 366/160 |
| 4,007,921 | 2/1977 | Zingg | 366/136 |
| 4,117,550 | 9/1978 | Folland | 366/136 |
| 4,125,331 | 11/1978 | Chisholm | 366/136 |

Primary Examiner—Robert W. Jenkins

[57] ABSTRACT

A fuel producing system for a solid/liquid mixture. The system comprises a mixing reservoir having a first inlet for receiving a combustible liquid fuel, and a second inlet for receiving a solid fuel pulverized to a mixable state with said liquid fuel. Mixing means is provided in the mixing reservoir to mix both fuels. Quantitative control means is also provided in the reservoir to measure predetermined amounts of the liquid and solid fuels delivered therein. A holding reservoir receives the solid/liquid fuel mixture from an output conduit of the mixing reservoir. Pump means is provided in the output conduit. First control means is further provided to shut off the flow of the fuel mixture to the holding reservoir to permit the mixing of further fuel mixture in the mixing reservoir. A second control means initiates the flow of the fuel mixture to the holding tank when the mixture fluid therein is extracted to a predetermined low level.

5 Claims, 1 Drawing Figure

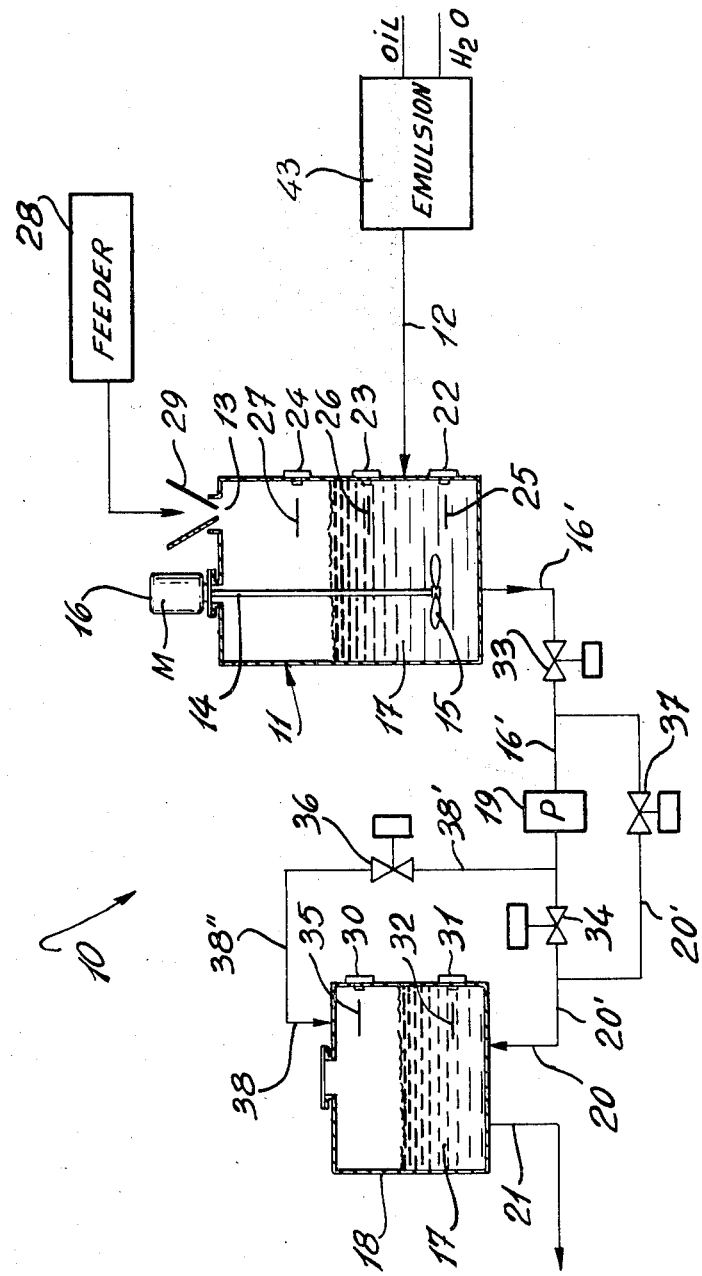

1

FUEL PRODUCING SYSTEM FOR SOLID/LIQUID MIXTURES

BACKGROUND OF INVENTION (a) Field of the Invention

The present invention relates to a fuel producing system and more particularly to a system for mixing a solid/liquid mixture and delivering such mixture to a holding tank whereby a continuous supply of the mixture to a consuming device is provided.

(b) Description of Prior Art

There is a need to provide a system which can economically mix a pulverized solid fuel with a combustible liquid fuel such as oil or an oil/water emulsion. For example, it is known to mix pulverized coal with liquid fuel and water to provide a combustible mixture. However, the systems known to do this are quite complex and expensive. Nonetheless, the reduction in the cost of the fuel mixture justifies the high cost of the system as there is a conservation of a fast depleting form of energy, that being oil. At the same time, a different form of consumable energy, that being coal, is used. The present system is an improvement over the prior art known to Applicant and it is expected that such improved system will greatly reduce the cost of producing the solid/liquid mixture and provide for the delivery of the mixture in a better consumable form to reduce the pollution emission.

SUMMARY OF INVENTION

Accordingly, a feature of the invention is to provide an improved fuel producing system for a solid/liquid mixture.

A further feature of the present invention is to provide a fuel producing system for a solid/liquid mixture which is relatively uncomplicated and which will provide for continuous supply of the mixture whilst preventing settling or separation of the mixture components such as pulverized coal - oil - water.

According to the above features, from a broad aspect, the present invention provides a fuel producing system for a solid/liquid mixture. The system comprises a mixing reservoir having a first inlet for receiving a combustible liquid fuel, and a second inlet for receiving a solid fuel pulverized to a mixable state with said liquid fuel. Mixing means is provided in the mixing reservoir to mix both fuels. Quantitative control means is also provided in the reservoir to measure predetermined amounts of the liquid and solid fuels delivered therein. A holding reservoir receives the solid/liquid fuel mixture from an output conduit of the mixing reservoir. Pump means is provided in the output conduit. First control means is further provided to shut off the flow of the fuel mixture to the holding reservoir to permit the mixing of further fuel mixture in the mixing reservoir. A second control means initiates the flow of the fuel mixture to the holding tank when the mixture fluid therein is extracted to a predetermined low level.

BRIEF DESCRIPTION OF DRAWINGS

A preferred embodiment of the present invention will now be described with reference to the drawing which is a schematic of the fuel producing system of the present invention.

DESCRIPTION OF PREFERRED EMBODIMENTS

Referring now to the drawing, there is shown generally at 10, the fuel producing system of the present invention. The system comprises a mixing reservoir 11 having a first inlet conduit 12 connected to a supply 43 of a combustible liquid fuel such as oil or a water/oil emulsion. A second inlet 13 supplies a pulverized solid fuel to the mixing reservoir 11. Mixing means 14 such as a mixing head 15 driven by a motor 16 is located within the reservoir 11 to mix the liquid combustible fuel and the pulverized or granular solid fuels.

An output conduit 16 delivers the mixture 17 within the reservoir 11 to a holding reservoir 18. Pump means 19, herein a centrifugal pump, provides for the convection of the mixture 17 to a mixture delivery inlet 20 of the holding reservoir 18. An outlet conduit 21 of the reservoir 18 is connected to a consuming load (not shown) and there is always sufficient quantity of the mixture 17 within the holding reservoir 18 to feed the consuming load.

In order to maintain a mixture within the holding reservoir and to assure that a mixture 17 from the mixing reservoir 11 can supply the holding reservoir, there is provided a control circuit which will now be described.

Firstly, with respect to the mixing reservoir, there is provided three level control sensors 22, 23 and 24. Sensor 22 detects a low level 25 conditioned in the reservoir 11 to shut off the pump 19 and thereby prevent further delivery of the mixture 17 to the holding reservoir. Further, the sensor 22 sends a signal to the supply 43 to deliver the combustible liquid fuel to the reservoir 11. As the liquid fuel enters the reservoir, it builds up to a level which is detected by the liquid fuel level sensor 23. Thus, at the liquid level 26, there is now a predetermined quantity of the combustible liquid fuel within the reservoir, namely, that quantity between levels 25 and 26.

The control sensor 23 then sends a signal to a feeder device 28 which feeds the pulverized or granular solid fuel to the inlet 13. As the pulverized solid fuel is delivered within the reservoir 11, the level of the mixture within the reservoir rises to the solid fuel level 27. Thus, a predetermined volume of solid fuel has been delivered to the reservoir and namely that quantity between levels 26 and 27. Thus, there are predetermined quantities of both the liquid fuel and the solid fuel delivered to the reservoir. The sensor 24 senses the level 27 and shuts off the feeder device 28 and also a shut-off valve 29 which may be provided to close the inlet 13. As the fuels are fed to the reservoir, the mixing head 15 is operating, continuously mixing the two fuels and this mixing will continue for sufficient time to ensure that there is a proper mix of all fuels. However, the fuels may be mixed only after their predetermined quantities have been delivered to the mixing reservoir 11.

Of course, the position of the sensors determines the ratio of the volume of the fuels to be mixed. The position of the lower sensor 22 determines the minimum quantity of mixture to be maintained within the mixing reservoir.

To provide a continuous supply of the mixture to a consuming load, there must be maintained a volume of the mixture within the delivery reservoir as heretofore mentioned. This is achieved by the provision of first and second control means which are also level control sensors and namely, sensors 30 and 31. Sensor 31 detects the low level 32 of the mixture within the reservoir 18 and controls the valves 33 and 34 to open and the pump 19 to operate. Thus, once the level 32 is reached, fuel mixture from the reservoir 11 is fed to the reservoir 18. When the level within the reservoir 18 reaches the high mixture level 35, the sensor 30 detects this level and shuts off valves 33 and 34 and opens valves 36 and 37. Thus, there is a recirculation loop connected from the inlet 20 to the other inlet 38 and the mixture will flow from the inlet conduit 20' through the valve 37 and into the conduit 16' at the inlet of the pump 19 and from the outlet of the pump 19 to conduit 38', as valve 34 is closed, and through valve 36, through conduit 38'' and into the second inlet 38 back into the reservoir 18. Thus, whilst a level of mixture is present within the reservoir 18 and between the levels 32 and 35, the mixture is continuously recirculated thus keeping the mixture in a proper emulsion state to prevent settling of the pulverized solid fuel and separation of the component parts of the mixture.

It can be seen that the present system also provides a novel method of mixing solid and liquid fuels into a mixture and maintaining that mixture in a holding reservoir in a continuously usable state.

It is within the ambit of the present invention to provide any obvious modifications of the preferred example described herein. For example, the recirculation circuit may be done away with at the holding reservoir. Instead, a mixing head or other form of agitating means could be provided within the reservoir, if this is deemed necessary and depending on the rate of extraction of the mixture from the holding reservoir. The supply of oil or water/oil emulsion may be from an emulsion device such as that disclosed in my U.S. Pat. No. 4,117,550 issued on Sept. 26, 1978. Further instead of using level sensors 22, 23 and 24 to control the volume of fuels delivered to the reservoir and the low level of the mixture, a weight sensor (not shown) could be adapted to the reservoir 11. The weight sensor would determine these volumes by their weight as the fuels are delivered to the reservoir. That is to say, when the low level 25 is reached the weight of the mixture will reach a minimum predetermined weight and this will cause the pump 19 to shut off. The liquid fuel then is delivered to the reservoir 11 until a second predetermined weight is reached corresponding to the desired volume. The supply is then shut off and the solid fuel is then delivered and weighed until a third desired weight is reached. Thus, there is provided another control means for the reservoir 11. Any obvious modifications are intended to be encompassed in the present application provided they are readable within the broad definition of the invention as defined by the appended claims.

I claim:

1. A fuel producing system for a solid/liquid mixture, said system comprising a mixing reservoir, said mixing reservoir having a first inlet for receiving a combustible liquid fuel, a second inlet for receiving a solid fuel pulverized to a mixable state with said liquid fuel means for mixing said liquid and pulverized solid fuels in said reservoir, quantitative control means associated with said mixing reservoir to measure predetermined amounts of said liquid and solid fuels delivered therein, a holding reservoir for receiving a solid/liquid fuel mixture from an output conduit of said mixing reservoir, pump means in said output conduit, first control means to shut off the flow of said fuel mixture to said holding reservoir to permit the mixing of further fuel mixture in said mixing reservoir, and second control means to initiate the flow of said fuel mixture to said holding tank when the mixture fluid therein is extracted to a predetermined low level.

2. A system as claimed in claim 1 wherein said quantitative control means comprises level control sensors to signal the delivery of said fuel at said first or second inlet and to detect a delivered volume of each said fuel to signal the termination of said delivery whereby predetermined amounts of said fuel from said first and second inlets are delivered to said mixing reservoir.

3. A system as claimed in claim 1 or 2 wherein a recirculation loop is provided with said holding reservoir, said recirculation loop including said pump means and having a control valve operable by said first and second control means to recirculate said fuel mixture in said holding reservoir when the flow of said mixture from said mixing reservoir is shut off.

4. A system as claimed in claim 3 wherein said first control means is a low level control sensor secured to said holding reservoir to sense a low level of said mixture therein, said second control means being a high level sensor secured to said holding reservoir to sense a high level of said mixture therein.

5. A system as claimed in claim 1 wherein said quantitative control means is a weight sensor to sense said predetermined amounts of said liquid and solid fuels delivered to said mixing eservoir.

* * * * *